United States Patent
Lantz et al.

(10) Patent No.: US 6,874,769 B2
(45) Date of Patent: Apr. 5, 2005

(54) STRUCTURED PACKING PLATE AND ELEMENT AND METHOD OF FABRICATING SAME

(75) Inventors: Bernard L. Lantz, Bel Aire, KS (US); Brian Hanley, Wichita, KS (US); Garry M. Gibson, Leon, KS (US); Timothy L. Holmes, Kingwood, TX (US)

(73) Assignee: Koch-Glitsch, LP, Wichita, KS (US)

( * ) Notice: Subject to any disclaimer, the term of this patent is extended or adjusted under 35 U.S.C. 154(b) by 18 days.

(21) Appl. No.: 10/678,810

(22) Filed: Oct. 3, 2003

(65) Prior Publication Data

US 2004/0135270 A1 Jul. 15, 2004

Related U.S. Application Data

(60) Provisional application No. 60/415,922, filed on Oct. 3, 2002.

(51) Int. Cl.[7] .................................................. B01F 3/04
(52) U.S. Cl. ....................... 261/95; 261/112.2; 261/113; 261/DIG. 72; 29/896.6
(58) Field of Search .......................... 261/94, 95, 112.1, 261/112.2, 113, DIG. 72; 29/896.6

(56) References Cited

U.S. PATENT DOCUMENTS

| | | | |
|---|---|---|---|
| 4,597,916 A | * | 7/1986 | Chen ............................ 261/94 |
| 4,604,247 A | | 8/1986 | Chen |
| 4,676,934 A | | 6/1987 | Seah |
| 4,740,334 A | * | 4/1988 | Rukovena, Jr. .......... 261/112.2 |
| 5,172,920 A | * | 12/1992 | Schlenk ...................... 277/654 |
| 6,276,045 B1 | | 8/2001 | Buchi |
| 6,385,987 B2 | * | 5/2002 | Schlom et al. ................ 62/304 |

FOREIGN PATENT DOCUMENTS

EP         0 750 940          1/1997

* cited by examiner

Primary Examiner—Scott Bushey
(74) Attorney, Agent, or Firm—J. David Wharton; Stinson Morrison Hecker LLP

(57) ABSTRACT

A mass transfer column is provided with an external shell defining an internal region. Packing elements are positioned within the internal region of the mass transfer column. The packing elements have one or more plates formed from sheet material that has been shaped to form a plurality of corrugations on each side of the plate as a series of peaks separated by valleys. A plurality of apertures are arranged across at least a portion of the plate and a plurality of tangs extend outwardly from the surface of the plate surrounding at least some of the apertures. At least some of the outwardly extending tangs are deformed toward the plate.

29 Claims, 5 Drawing Sheets

STRUCTURED PACKING PLATE AND ELEMENT AND METHOD OF FABRICATING SAME

CROSS REFERENCE TO RELATED APPLICATIONS

This application claims the benefit of priority to provisional application Ser. No. 60/415,922 filed on Oct. 3, 2002.

BACKGROUND OF THE INVENTION

The present invention relates to mass transfer and heat exchange columns and, more particularly, to structured packing elements utilized within such columns to facilitate interaction between fluid streams.

Various types of packing elements are commonly used in mass transfer and heat exchange columns to facilitate interaction between fluid streams flowing within the column. Normally, these fluid streams include a downwardly flowing liquid stream and an upwardly flowing vapor stream. One type of packing element used in such columns is commonly referred to as structured packing and comprises a plurality of corrugated plates that are formed from sheet material such as metal. The corrugated plates are arranged in a parallel and upright orientation and are commonly secured together in a bundle commonly referred to as a "brick." The horizontal cross section of the column is normally filled with one or more bricks and multiple vertically adjacent layers of bricks may be utilized to form a packing bed of a preselected height within one or more regions of the column.

The corrugations of adjacent structured packing plates of the type described above are normally arranged in criss-crossing relationship and extend at a preselected angle, such as 45 or 60 degrees, to the vertical column axis. The corrugations of adjacent plates are normally in contacting relationship, but may also be spaced apart by spacers, an interposed flat plate or other methods. It is also known to arrange the plates with the corrugations of adjacent plates extending in parallel relationship.

Various types of texturing and treatments have been applied to the surface of the above-described corrugated plates to facilitate the mass transfer between the fluid streams and to reduce the pressure drop as the fluid streams flow through the structured packing beds. For example, a plurality of apertures in the plates have been utilized to permit fluid to pass from one side to the other side of each plate and to enhance the lateral spreading of liquid flowing downwardly along the plate surfaces. Rows of horizontally extending grooves are also utilized to facilitate the lateral spreading of the descending liquid. In another example, described in U.S. Pat. No. 4,740,334 to Rukovena, Jr., rows of hollow cone shaped protuberances with perforated peaks are formed in the corrugated plates and are said to cause more uniform wetting of the surface of the plates. The perforated peaks have small openings that are formed by small slits in the wall of the peak. These openings are described as being smaller in area and size than the opposed inlet to the cone shaped protuberance.

Although the surface texturing and treatments of the types described above may increase the efficiency of the packing plates, further improvements in efficiency are desired.

Sheets of perforated metal have also been used as part of a composite material usable for producing gaskets. In U.S. Pat. No. 5,172,920 to Schlenk, the metal sheet is perforated with a plurality of square holes, each of which is bordered by a set of four triangular tangs that are flared outwardly with respect to the hole. While the specific construction of the perforated metal sheet is described as useful as a gasket material substrate, there is no suggestion that the perforated metal sheet might be used as a structured packing.

SUMMARY OF THE INVENTION

In one aspect, the invention is directed to a mass transfer column having an external shell defining an open internal region. One or more packing elements are positioned within the internal region. The one or more of the packing elements include at least one plate formed from sheet material that has been shaped to form a plurality of corrugations on each side of the plate as a series of peaks separated by valleys. There are a plurality of apertures arranged across at least a portion of the plate and a plurality of tangs extending outwardly from the surface of the plate surrounding at least some of the apertures. At least some of the outwardly extending tangs are deformed toward the plate.

In another aspect, the invention is directed to a method of making a packing element for an exchange column. The method includes forming a plurality of apertures across at least a portion of a plate formed of sheet material such that at least some of the apertures are surrounded by a plurality of outwardly extending tangs. The method also includes shaping the plate to form a plurality of corrugations on each side of the plate as a series of peaks separated by valleys. The shaping of the corrugated plate, if performed after the formation of the tangs, causes at least some of the plurality of tangs to be deformed toward the plate. The invention is also directed to packing element for an exchange column.

BRIEF DESCRIPTION OF THE SEVERAL VIEWS OF THE DRAWINGS

In the accompanying drawings which form part of the specification and are to be read in conjunction therewith and in which like reference numerals are used to indicate like parts in the various views.

DETAILED DESCRIPTION OF THE INVENTION

Figure 1:
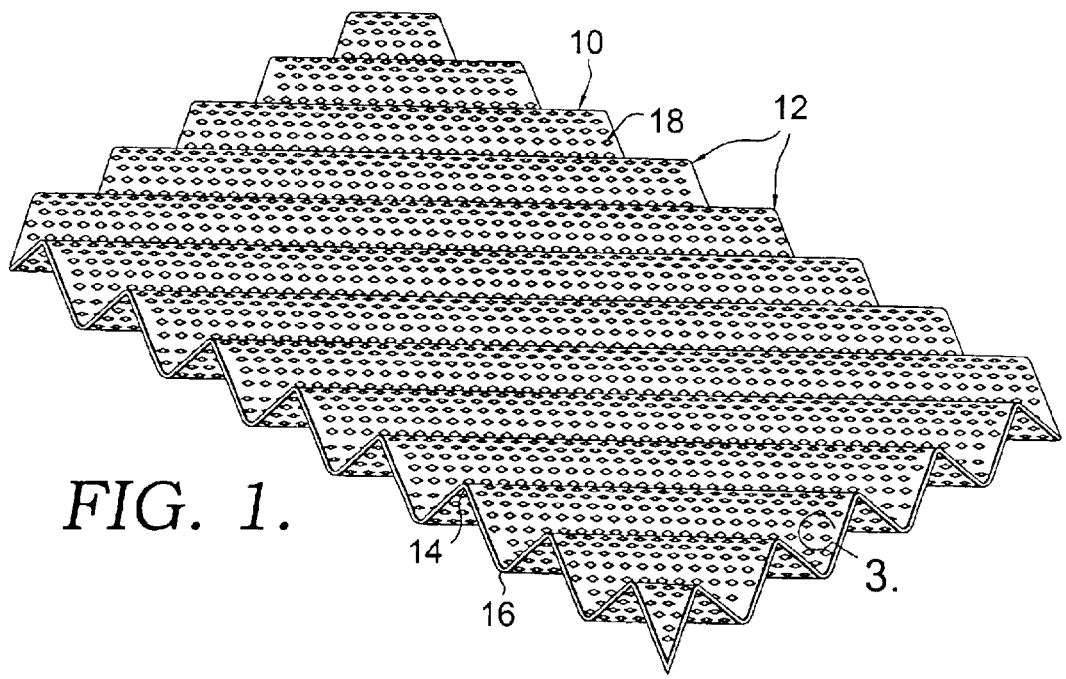
FIG. 1 is a side elevation view of a corrugated structured packing plate constructed in accordance with the present invention.
Figure 2:
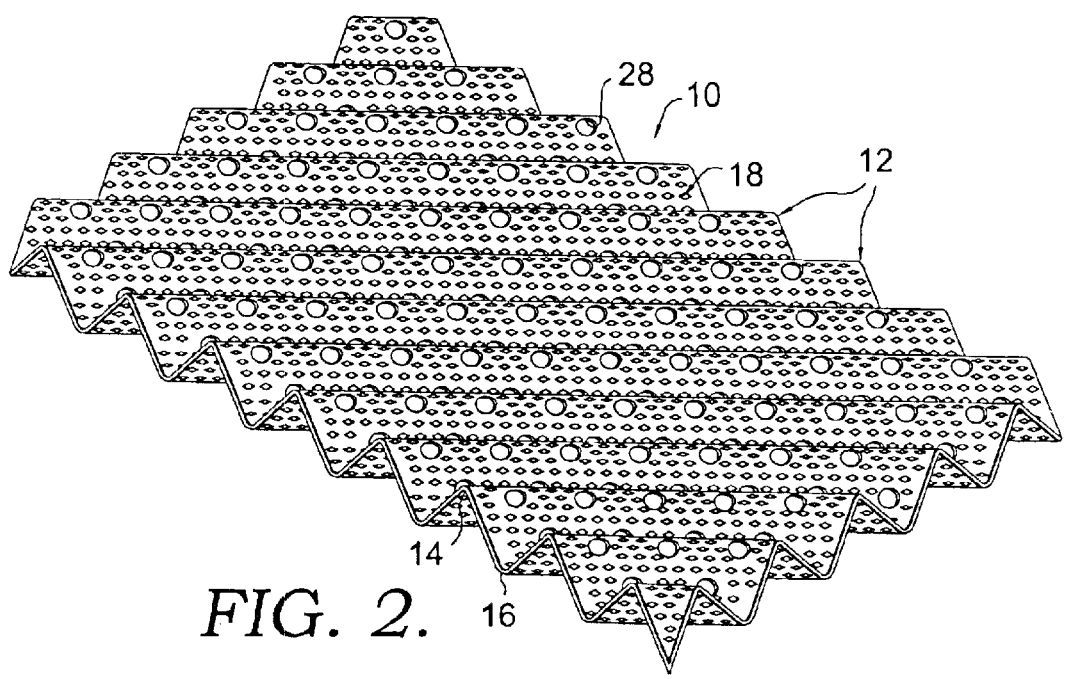
FIG. 2 is a greatly enlarged fragmentary perspective view of the plate of FIG. 1 showing an aperture and surrounding tangs.

Referring now to the drawings in greater detail and initially to FIGS. 1 and 2, a corrugated plate made in accordance with the present invention for use as a structured packing in a mass transfer or heat exchange column is designated by the numeral 10. Plate 10 is formed from sheet material that has been shaped to form a plurality of corrugations 12 that extend in parallel relationship to each other. The corrugations 12 form, on each side of the plate 10, a series of peaks 14 separated by valleys 16. The amplitude or crimp height of the corrugations 12 can be varied as desired and is not limited to that shown in the drawings. The sheet material used to form plate 10 is preferably a metal such as stainless steel, aluminum or carbon steel, but polymeric or other materials which can be shaped and constructed in the manner described herein can also be used.

The plate 10 includes a plurality of apertures 18 of a preselected size and configuration that are arranged in a preselected pattern across at least a portion and preferably all of the plate 10. The apertures 18 are preferably of a round or square configuration, but can also be formed as ovals, slots, diamonds, hexagons or other polygons. The size of the apertures 18 can vary widely depending upon the intended application. By way of example and not limitation, apertures having a diameter of 0.01 inch to 0.25 inch are suitable for many applications. The apertures 18 can be arranged in various patterns, such as parallel rows and offset rows. The rows of apertures 18 may extend parallel to the peaks 14 and valleys 16 of the corrugations 12 or at an angle thereto. The apertures 18 may all be of the same size or they may be arranged in patterns of two or more sizes.

Each aperture 18 is surrounded about its perimeter by a plurality of tangs 20 that extend outwardly from the surface of the plate 10. The tangs 20 on each plate 18 may extend in only one direction or, more preferably, the tangs 20 surrounding some apertures 18 extend in one direction and the tangs 20 surrounding the other apertures 18 extend in the opposite direction. For example, the tangs 20 surrounding adjacent apertures 18 on each plate 18 may extend in opposite directions.

The number of tangs 20 surrounding each aperture 18 is preferably four, but a greater or lesser number of tangs 20 can be provided. The tangs 20 are preferably formed by punching and are configured in the manner described in U.S. Pat. No. 5,172,920, which is incorporated herein by reference in its entirety. Each tang 20 is preferably of triangular shape with a base 22, two sides 24 and a peak 26. The base 22 of the tang 20 is attached to and integral with the unperforated portion of the plate 10. The two sides 24 of each tang 20 are preferably separated along substantially their entire length from the sides 24 of the adjacent tangs 20 that surround a common aperture 18.

During fabrication of plate 10, the apertures 18 and tangs 20 are normally formed in the sheet material, following by crimping of the sheet to form the corrugations 12 using known techniques. As a result of the crimping process, the outwardly extending tangs 20 are normally bent inwardly upon themselves along at least the peaks 14 and valleys 16. In order to minimize blockage of the apertures 18, it is generally preferred that the peaks 26 of the tangs 20 be bent in a direction away from the associated aperture 18. This result can be obtained by ensuring that the tangs 20 are splayed outwardly a sufficient amount from the associated aperture 18 during formation of the tangs 20. Surprisingly, compression of the tangs 20 during the crimping process is not believed to have a large detrimental effect on the performance of the plate 10. Alternatively, but less preferably, the tangs 20 can be formed in the plate 10 after the plate 10 has been subjected to the crimping process or special crimping dies can be used to form the corrugations while minimizing or eliminating the compression of the tangs already formed in the flat sheet material.

Figure 3:
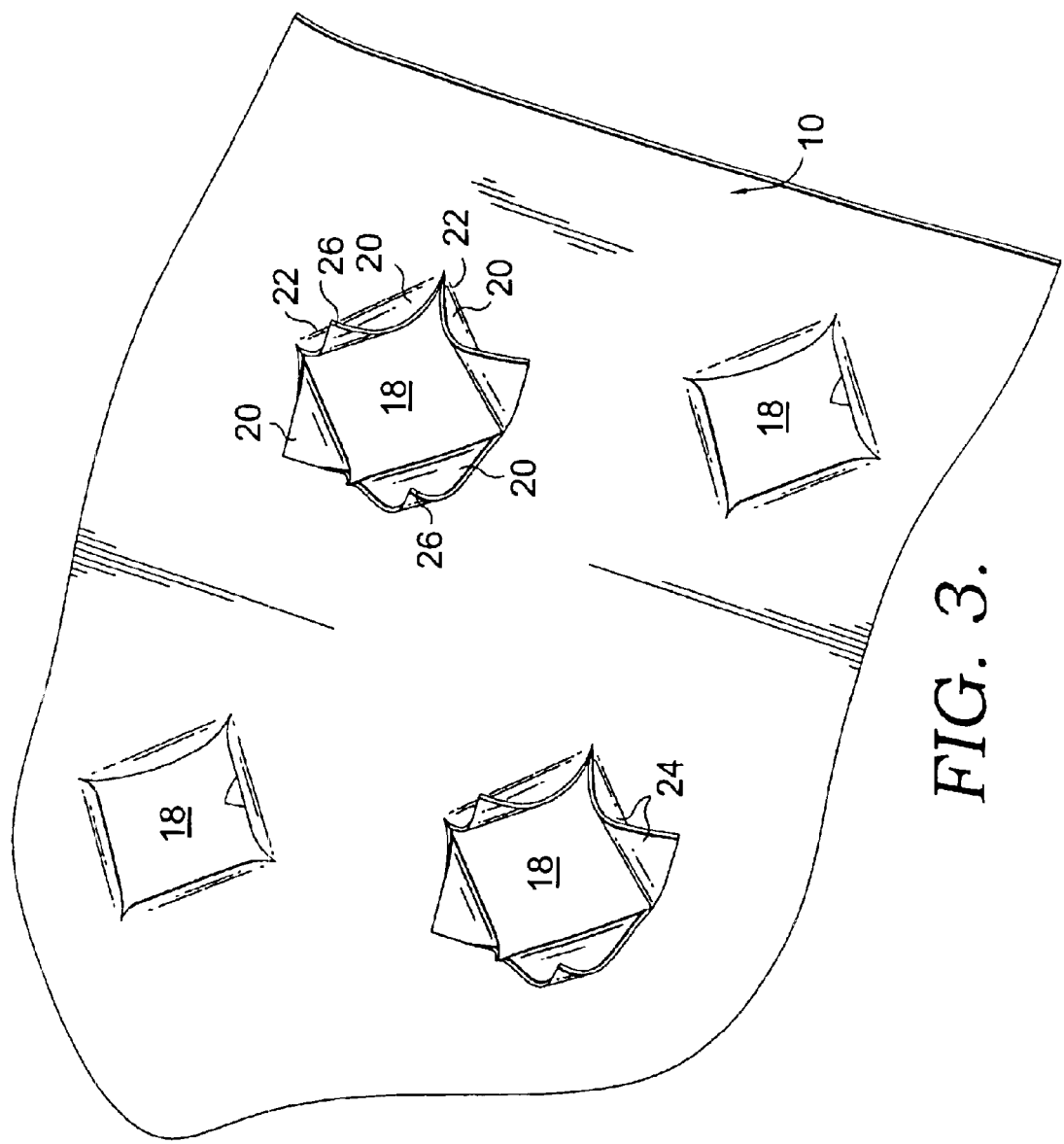
FIG. 3 is an alternate embodiment of the structured packing plate shown in FIG. 1.

It will be appreciated that other surface texturing or treatment can be used in combination with the apertures 18 and 20 on plate 10. For example, significantly larger apertures 28 without surrounding tangs can be used as depicted in FIG. 3.

The plate 10 is formed into a structured packing element such a packing bundle or brick by placing a plurality of plates 10 together in side by side relationship. The corrugations 12 in adjacent plates are preferably in contacting and crisscrossing relationship, but can be arranged in spaced apart and/or parallel relationship if desired. One or more packing bricks are then placed in a mass transfer or heat exchange column with the plates 10 extending upright and the corrugations 12 arranged at an angle to a vertical axis of the column.

Figure 4:
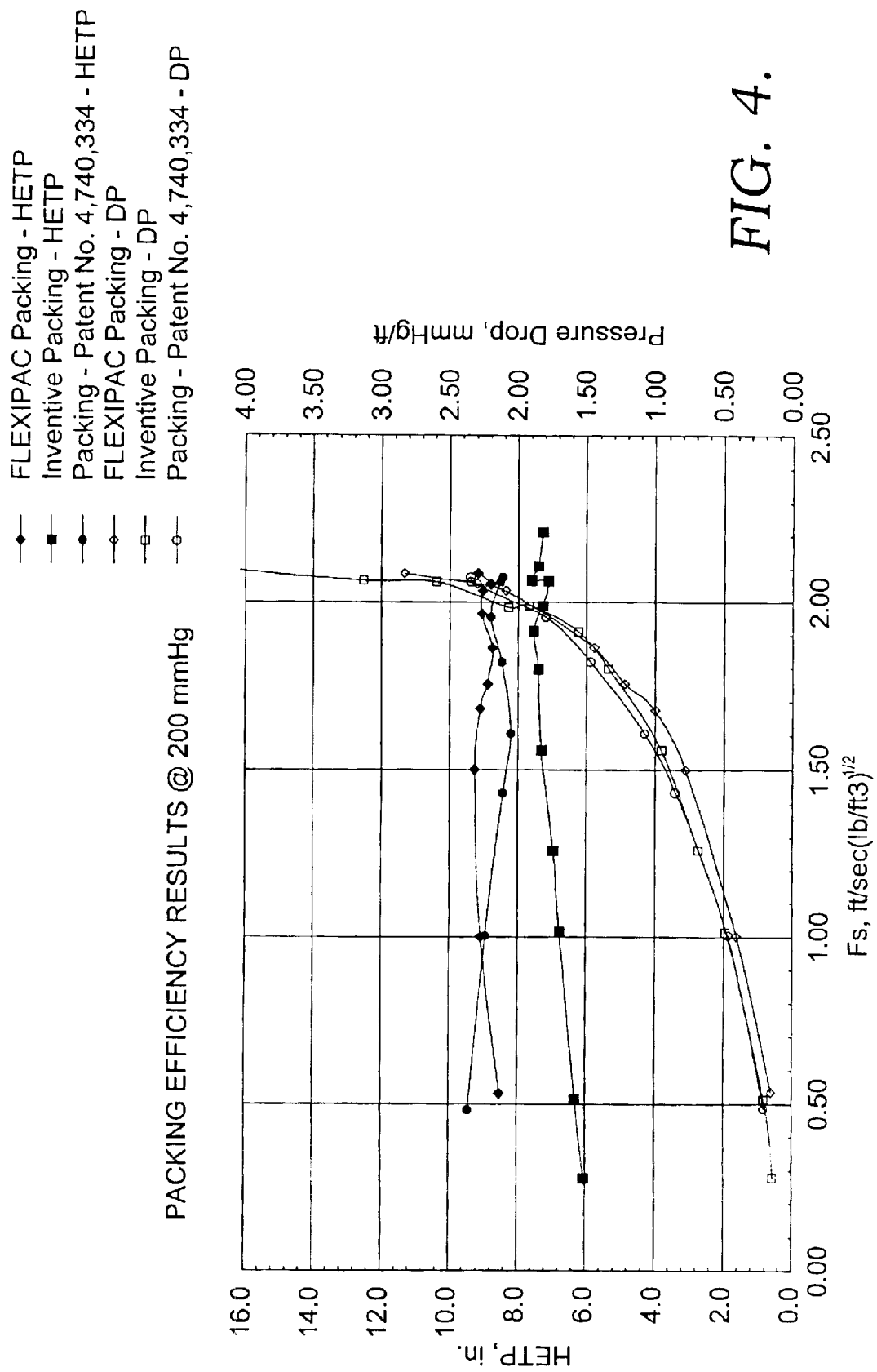
FIGS. 4–6 are graphs depicting the results of comparative tests of structured packing elements performed at different column pressures.
Figure 5:
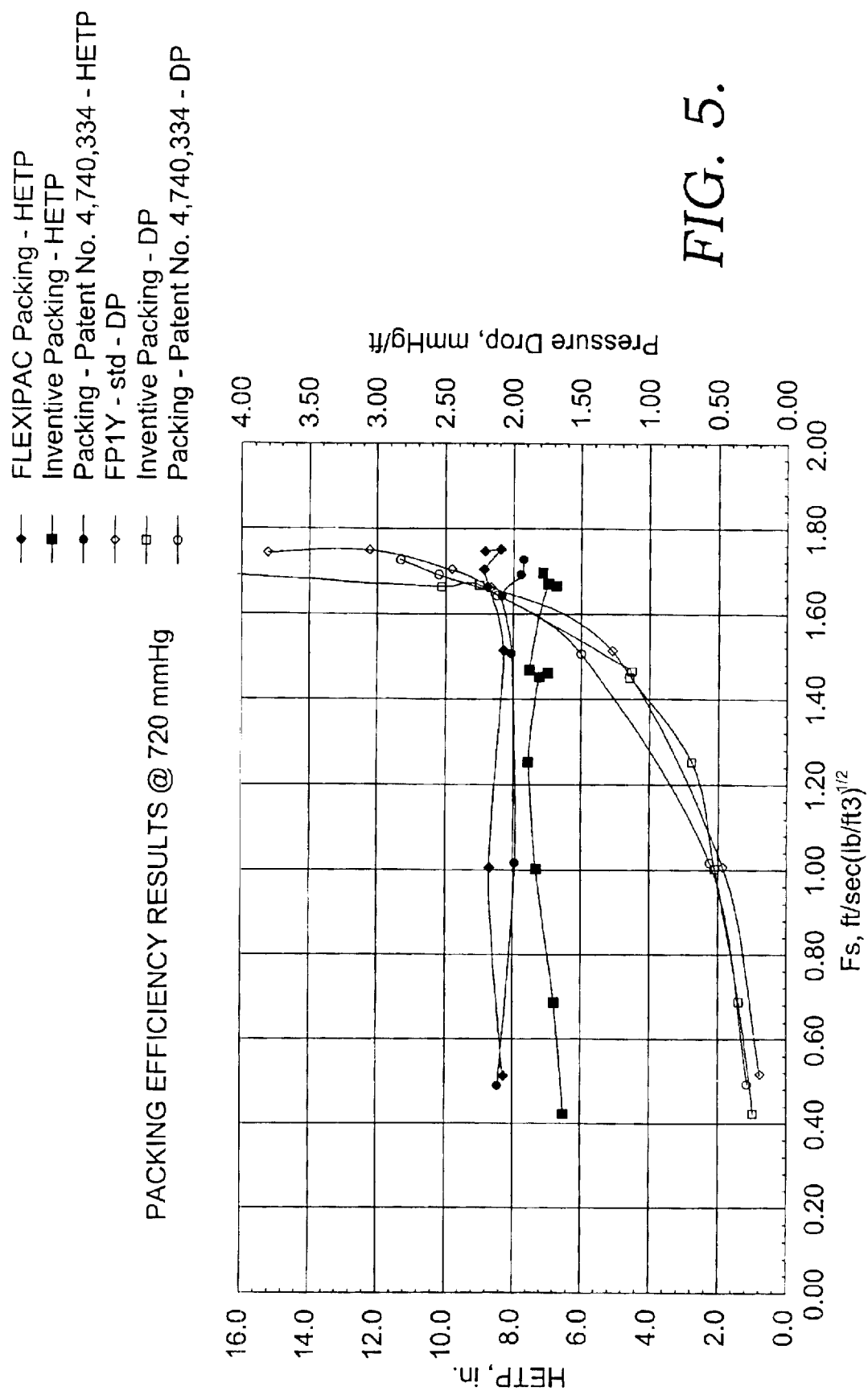
Figure 6:
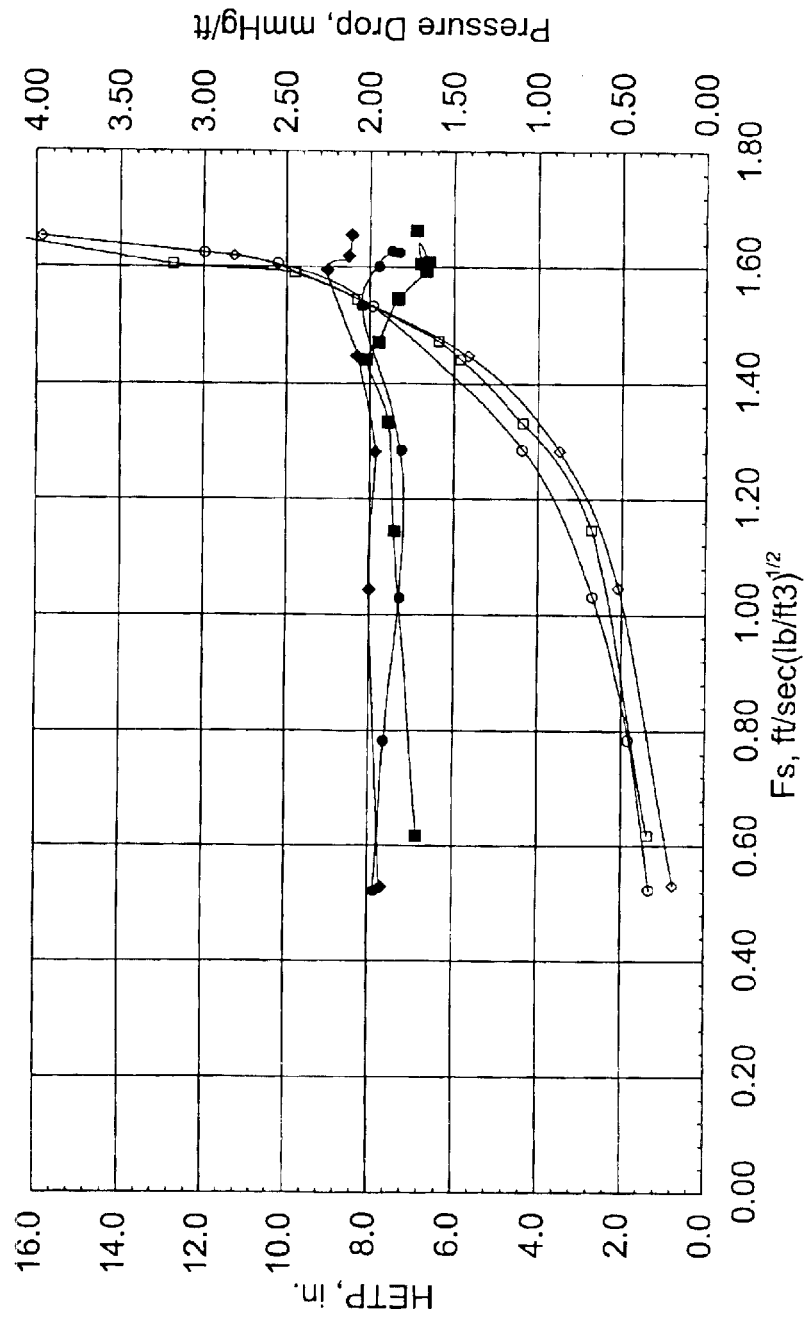

It has been unexpectedly determined through comparative tests that structured packing elements formed from plates 10 constructed in accordance with the present invention demonstrate significantly better separation efficiency than commercially available structured packing elements. Surprisingly, this result is obtained even after the tangs 20 have been compressed as a result of the crimping process that forms the corrugations 12. The tests were performed in a pilot column using para- and ortho-xylene as the liquid and vapor streams. The structured packing elements formed from plates 10 were compared against a commercial version of the structured packing element depicted in U.S. Pat. No. 4,740,334 and a commercial structured packing element containing perforation and grooves as depicted in U.S. Pat. No. 4,296,050 and marketed under the FLEXIPAC® trademark. The test results conducted at different column pressures are set forth in FIGS. 4–6. Each packing element contained corrugations with a ¼ inch crimp height and the corrugations were aligned at a 45 degree angle from the vertical axis of the column. The plates 10 used in the structured packing element of the present invention are designated "Inventive Packing" in the drawing legend and contained apertures 18 having a 0.063 inch size and 0.256 inch spacing. The plates constructed in accordance with U.S. Pat. No. 4,740,334 are so designated in the drawing legend and contained 0.02 inch apertures. The FLEXIPAC® brand packing is also labeled in the drawing legend and contained 0.157 inch apertures.

The present invention has been described in relation to particular embodiments, which are intended in all respects to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims.

The invention claimed is:

1. A packing element for an exchange column comprising:
   at least one plate formed from sheet material shaped to form a plurality of corrugations on each side of the plate as a series of peaks separated by valleys;
   a plurality of apertures arranged across at least a portion of the plate; and
   a plurality of tangs extending outwardly from the surface of the plate surrounding at least some of the apertures, wherein at least some of the outwardly extending tangs have been deformed toward the plate.

2. The packing element of claim 1, wherein the sheet material is one of stainless steel, aluminum, carbon steel or a polymeric material.

3. The packing element of claim 1, wherein a plurality of the plates are secured together in a bundle to form a brick.

4. The packing element of claim 3, wherein the corrugations of adjacent plates are arranged in a crisscrossing relationship.

5. The packing element of claim 4, wherein the corrugations of adjacent plates are in a contacting relationship.

6. The packing element of claim 1, wherein the apertures are of a round or square configuration.

7. The packing element of claim 1, wherein the apertures are of the same size.

8. The packing element of claim 1, wherein the apertures are two or more sizes.

9. The packing element of claim 1, wherein the number of tangs surrounding the apertures is four.

10. The packing element of claim 9, wherein the tangs are formed by punching.

11. The packing element of claim 10, wherein at least some of said tangs have a triangular shape with a base, two sides and a peak.

12. The packing element of claim 11, wherein the base of the tang is attached to and integral with the unperforated portion of the plate.

13. The packing element of claim 12, wherein the tangs are bent inwardly upon themselves.

14. The packing element of claim 13, wherein the tangs are splayed outwardly from the associated aperture during the formation of the tangs.

15. The packing element of claim 14, wherein the tangs are bent in a direction away from the associated aperture.

16. The packing of claim 1, further comprising:

a plurality of larger apertures without surrounding tangs.

17. The packing of claim 1, wherein the plate has opposed faces and wherein the tangs extend outwardly from at least one face of the plate.

18. The packing of claim 17, wherein the tangs extend outwardly from both faces of the plate.

19. The packing element of claim 18, wherein the tangs surrounding adjacent apertures extend in different directions.

20. A method for making a packing element for an exchange column, the method comprising:

forming a plurality of apertures across at least a portion of a plate formed of sheet material such that at least some of the apertures are surrounded by a plurality of outwardly extending tangs; and shaping the plate to form a plurality of corrugations on each side of the plate as a series of peaks separated by valleys, wherein the shaping of the corrugated plate causes at least some of the plurality of tangs to be deformed toward the plate.

21. The method of claim 20, wherein the corrugations are formed of the sheet by crimping the sheet.

22. The method of claim 20, wherein the apertures and tangs are formed by punching.

23. The method of claim 22, wherein the tangs are bent inwardly upon themselves.

24. The method of claim 23, wherein the tangs are splayed outwardly from the associated aperture during the formation of the tangs.

25. The method of claim 24, wherein the tangs are bent in a direction away from the associated aperture.

26. A mass transfer column comprising:

an external shell defining an open internal region; and one or more packing elements are positioned within the internal region, wherein the one or more of the packing elements comprise at least one plate formed from sheet material that has been shaped to form a plurality of corrugations on each side of the plate as a series of peaks separated by valleys, a plurality of apertures arranged across at least a portion of the plate and a plurality of tangs extending outwardly from the surface of the plate surrounding at least some of the apertures, wherein at least some of the outwardly extending tangs have been deformed toward the plate.

27. The mass transfer column of claim 26, wherein the packing elements are placed in the mass transfer column with the plates extending upright.

28. The mass transfer column of claim 27, wherein the corrugations of the plates are arranged at an angle to a vertical axis of the column.

29. The mass transfer column of claim 28, further comprising:

multiple adjacent layers of packing elements.

\* \* \* \* \*